(12) United States Patent
Harron et al.

(10) Patent No.: US 7,383,296 B2
(45) Date of Patent: *Jun. 3, 2008

(54) APPARATUS FOR FRACTIONAL RF SIGNAL SYNTHESIS WITH PHASE MODULATION

(75) Inventors: Gerald Harron, Martensville (CA); Surinder Kumar, Victoria (CA)

(73) Assignee: Vecima Networks Inc., Victoria, British Columbia (CA)

( * ) Notice: Subject to any disclaimer, the term of this patent is extended or adjusted under 35 U.S.C. 154(b) by 643 days.

This patent is subject to a terminal disclaimer.

(21) Appl. No.: 10/796,415

(22) Filed: Mar. 10, 2004

(65) Prior Publication Data

US 2005/0091295 A1 Apr. 28, 2005

Related U.S. Application Data

(60) Provisional application No. 60/513,984, filed on Oct. 27, 2003.

(51) Int. Cl.
*G06F 1/02* (2006.01)
*H03K 21/00* (2006.01)

(52) U.S. Cl. .................... 708/271; 327/107
(58) Field of Classification Search ............... 708/270, 708/271; 327/105, 107
See application file for complete search history.

(56) References Cited

U.S. PATENT DOCUMENTS

| 4,590,445 | A | * | 5/1986 | Tabourier et al. | ............ 342/200 |
| 5,671,227 | A | * | 9/1997 | Keller et al. | ................ 370/509 |
| 5,905,388 | A | * | 5/1999 | Van Der Valk et al. | ..... 327/107 |
| 7,162,000 | B2 | * | 1/2007 | Stengel et al. | .............. 375/373 |

* cited by examiner

*Primary Examiner*—Chuong D Ngo
(74) *Attorney, Agent, or Firm*—Adrian D. Battison; Michael R. Williams; Ryan W. Dupuis

(57) ABSTRACT

A method to improve the frequency resolution and phase noise of a synthesized RF signal results in superior instantaneous frequency change and phase modulation capability, wide frequency set ability, and suitability for implementation in a digital ASIC. The RF signal synthesis is achieved from a higher reference frequency clock signal using a variable pulse stretching technique. The amount of the pulse stretch in each cycle is set by a phase increment value and is implemented using programmable delay lines. Pulse stretching can be extended beyond one cycle by pulse swallowing, allowing the generation of an RF signal with frequencies from DC up to the input reference frequency. Phase modulation is incorporated by digital control of the phase stretching with the phase modulation bits.

27 Claims, 9 Drawing Sheets

APPARATUS FOR FRACTIONAL RF SIGNAL SYNTHESIS WITH PHASE MODULATION

This application claims priority under 35 U.S.C. 119 from Provisional Application Ser. No. 60/513,984 filed Oct. 27th 2003.

This invention relates generally to telecommunication systems. The present invention relates more specifically to a method of synthesis of a phase modulated RF signal for use in telecommunication systems.

RELATED APPLICATIONS

This application is related to applications filed on the same day by the same inventors under application Ser. No. 10/796,416 entitled APPARATUS FOR DIGITAL VECTOR QAM MODULATOR and application Ser. No. 10/796,417, now U.S. Pat. No. 7,084,676, entitled APPARATUS FOR FRACTIONAL RF SIGNAL SYNTHESIS the disclosures of which are incorporated herein by reference.

BACKGROUND OF THE INVENTION

In communication systems an oscillator subsystem is used as a fundamental building block. Oscillators are commonly used for up or down frequency conversion. They are also essential subsystems for direct frequency modulators and many other systems. The quality of a fixed frequency oscillator is most often measured by the frequency accuracy and the phase noise performance. In communication systems the basic RF oscillator is used in conjunction with additional circuitry used to control the frequency of the oscillator. Free running RF oscillators do not have adequate frequency accuracy for most communication system requirements. It is well understood that crystal oscillators provide a high degree of frequency accuracy and phase noise performance. Therefore, it is common in prior art to lock the RF oscillator frequency to a lower frequency crystal oscillator and achieve the desired frequency stability. Some of the other highly sought after qualities include the ability to tune a single oscillator over a wide frequency range with a very fine frequency resolution control, and the ability to change the frequency very rapidly. Further, it is common to add phase modulation to an oscillator by changing the phase of the oscillator versus time. Numerous prior art methods exist for implementing oscillators with varying compromises and limitations. Some of those methods are described below.

The first common method is frequency multiplication wherein lower frequency crystal oscillator signals are converted to higher frequency signals using frequency multiplication. One example of this arrangement is described in detail hereinafter.

The second method uses a phase locked loop (PLL). PLLs are available in a variety of forms such as fixed modulus, dual modulus, and fractional N. Many integrated circuit implementations are available. One example of this arrangement is described in detail hereinafter. So the design objective is to set the loop bandwidth as wide as possible to track out as much close in phase noise as possible. Further out phase noise, outside the loop bandwidth, is limited by the oscillator phase noise characteristic. However, there is a compromise well understood by people skilled in the art. This compromise results from the fact that smaller frequency step size (higher resolution) requires division to a lower common phase detector frequency. A PLL with lower loop bandwidth thus has to be used which consequently degrades the phase noise. Phase modulation is achieved by adding a second control of the VCO frequency. This control will only work if the loop bandwidth is narrow enough to not track out the phase modulation that is added.

The third method is a digital delay lock loop (DLL). This has the advantage that the oscillator is suitable for implementation in an ASIC. A variable delay control is used in conjunction with the phase detector to lock the oscillator frequency to a multiple of the input reference frequency. One example of this arrangement is described in detail hereinafter this method suffers from limitations to the PLL implementation. It also faces additional problems with frequency agility as well as the jitter introduced by the delay lock loop because of mismatched delays. Phase modulation is generally not added to DLLs, but could be added to the reference input or after the loop filter similar to the PLL method.

The fourth method is known as direct digital synthesis (DDS). One example of this arrangement is described in detail hereinafter. This method results in very fine frequency resolution, but produces undesired spurious signals and the output signal frequency is limited by the speed of the DAC. The signal frequency for the DDS is limited to Nyquist frequency which is half of the clock frequency to the DAC. Output signal level drops as the Nyquist frequency is approached. Phase modulation bits are commonly available in DDSs.

A fifth method is through phase interpolation as described in U.S. Pat. No. 6,114,914. This method is limited in its factional capability and still uses a VCO, phase detector, and loop filter. Normal conflict between better phase noise and higher frequency resolution still exists for this method. The addition of phase modulation would have similar limitations to the PLL method.

In phase modulation systems it is understood in the art that it is desirable to control the shape of the phase change. Sudden phase changes result in splatter of energy outside the bandwidth allocated to the signal, and degrades other channels. It is common to digitally generate the phase modulation and shape it using digital filtering such as sin x/x. The resulting digital signal is processed through a Digital to Analog converter (DAC) using a conversion clock that is at least twice the rate of the phase change information. Using a low pass filter commonly referred to as a reconstruction filter, the conversion clock frequency and the aliasing components resulting from the DAC are filtered off to reconstruct the desired baseband signal. Without the reconstruction filter, the baseband signal contains many undesired components. It is understood in the art that the conversion clock generally has to be of significantly higher frequency than the baseband rate in order to produce enough frequency separation between the baseband and the clock/aliasing components. This thereby allows the implementation of a low pass filter with enough rejection to remove the undesired components without adding significant amplitude and group delay to the desired baseband signal. Interpolating DACs that accept a digital baseband signal at a lower rate and multiply the sample rate (conversion clock) by 2 or 4 times are now common. They typically provide an interpolation according to a sin x/x curve to fill in the additional sample values. This simplifies the reconstruction filter and reduces the processing requirements that would be required to produce a higher sampling rate signal. These methods are based on the use of a DAC and require reconstruction filtering of the output to achieve the desired signal.

SUMMARY OF THE INVENTION

According to the invention there is provided an apparatus for direct digital generation of a synthesized RF signal with phase modulation comprising:

a high speed reference clock providing in an input signal having a series of signal reference edges at a frequency of the reference clock which is higher than the desired output frequency;

programmable digital delay elements arranged to receive the reference edges of the input reference clock and to generate delayed signal edges each at a calculated delay from a respective reference edge;

wherein the programmable digital delay elements include an input element for receiving data defining a required phase modulation and providing a delay value for said calculated delay;

and a signal combining element for receiving the delayed signal edges and for generating the RF signal therefrom.

Preferably the output frequency is set from an increment value according to the following equation:

Increment Value=$((f_{ref}/f_{out})-1)*2^n$ where $f_{ref}$=Reference clock (103) frequency
$f_{out}$=Output (110) frequency
n=Number of bits in the accumulator math.

Preferably the 50% duty cycle is set by initializing the difference of the initialize values of the two accumulators according to the following equation: The reference clock frequency divided by the desired output frequency multiplied by $2^n$, where n is equal to the number of bits in the accumulator.

Preferably the worst case frequency resolution is determined by the equation:

The reference frequency divided by $2^n$, where n is equal to the number of bits in the accumulator.

Preferably the duty cycle of the output can be varied by changing the difference in the start values of the accumulators for the rising and falling edge delay control.

Preferably the interpolator is a linear interpolator.

Preferably the interpolator is a sin x/x interpolator filter.

Preferably the need for a reconstruction filter is removed by interpolation up to the reference clock rate.

Preferably phase delay of the programmable delay is calibrated from the phase accumulator value using a look up table or Microprocessor.

Preferably separate delay controls are used for producing the rising and falling edges of the output from the same input edge of the reference clock.

Preferably the reference edge of the reference clock is delayed by the programmable delay lines.

Preferably the reference edge may be either the rising or falling edge of the reference clock.

Preferably the carry bits (overflow bits) are used to control a pulse swallowing circuit to extend the delay to multi cycles of the input reference clock.

Preferably the clock swallow circuit can ignore/block multiple reference clock pulses thus giving the delay line endless delay capability.

Preferably the clock swallow circuit can be located prior to or following the programmable delay line.

Preferably a set reset flipflop is used to combine the separate rising and falling edge delays to form any desired duty cycle output.

Preferably the output duty cycle is not dependent on the input duty cycle.

Preferably increasing the number of bits in the adder math increases the frequency resolution with negligible degradation in the phase noise performance.

Preferably the number of bits of math used in the adder can be equal to or exceed the number of bits of control in lookup table and/or the programmable delay.

Preferably the speed can be increased using parallel processing in the adders, and/or accumulators.

Preferably the adders/accumulators can be implemented in a larger lookup table wherein all the answers of the pattern are pre-computed and stored.

Preferably an optional arrangement could include plurality of adders, accumulators, pulse swallow circuits, lookup tables, and programmable delay lines.

Preferably the lookup table would have a multiple set of lookup tables to be used for temperature compensation of the programmable delay line.

Preferably the implementation is done fully digitally in an ASIC with no requirement for a voltage controlled oscillator, loop filter, or Digital to Analog converter used in prior art solutions.

Preferably an optional arrangement could include amplification and filtering of the output to produce a signal that is higher in amplitude and/or having less harmonics.

The present invention realizes an RF signal that has superior phase noise and frequency resolution with the additional benefits of instantaneous frequency change capability, wide frequency range ability, and suitability for digital ASIC implementation with no external components.

The present invention is based on digital generation of a phase modulated RF signal from a higher frequency reference signal using pulse stretching to delay each edge of the reference clock to the desired time instant. In the proposed method, provision is made to swallow a clock edge when required thereby allowing the synthesis of any desired lower frequency from DC to the reference input frequency.

Figure 5:
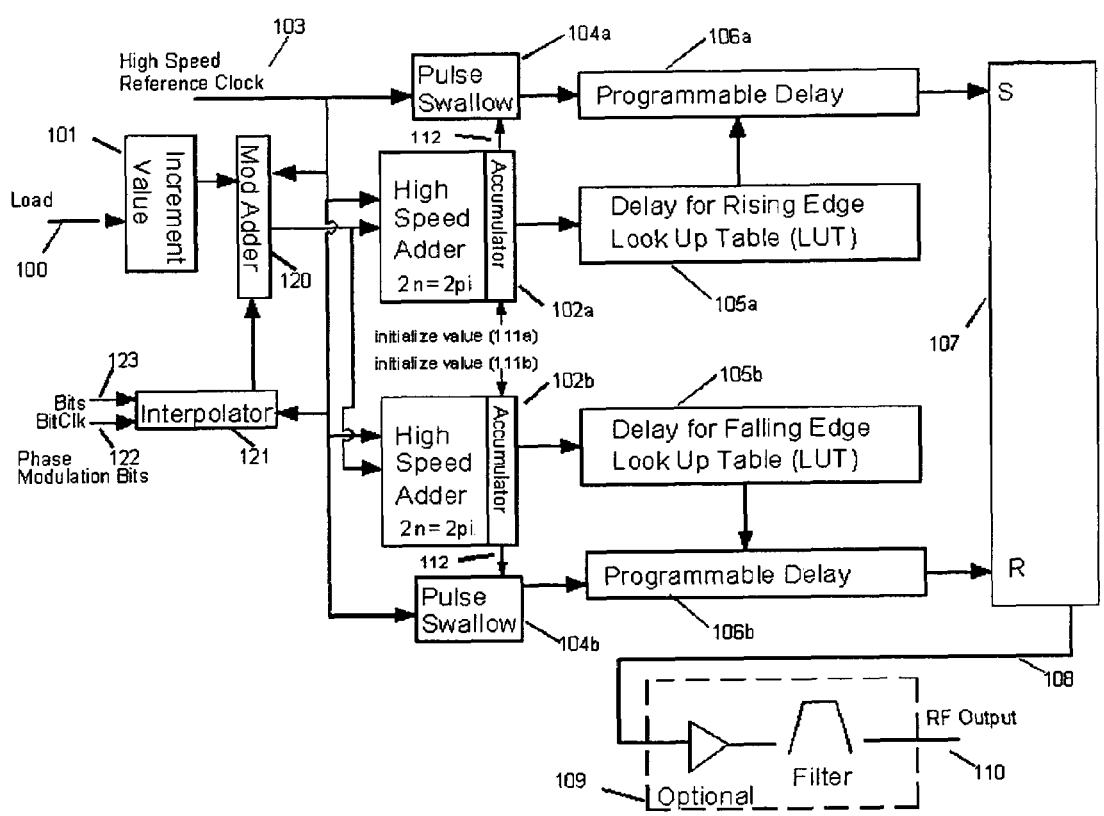
FIG. 5 is a block diagram showing a System for RF signal synthesis according to the present invention.

Table 1 is a Sample timing calculations for the embodiment shown in FIG. 5.

DETAILED DESCRIPTION

PRIOR ART

Figure 1:
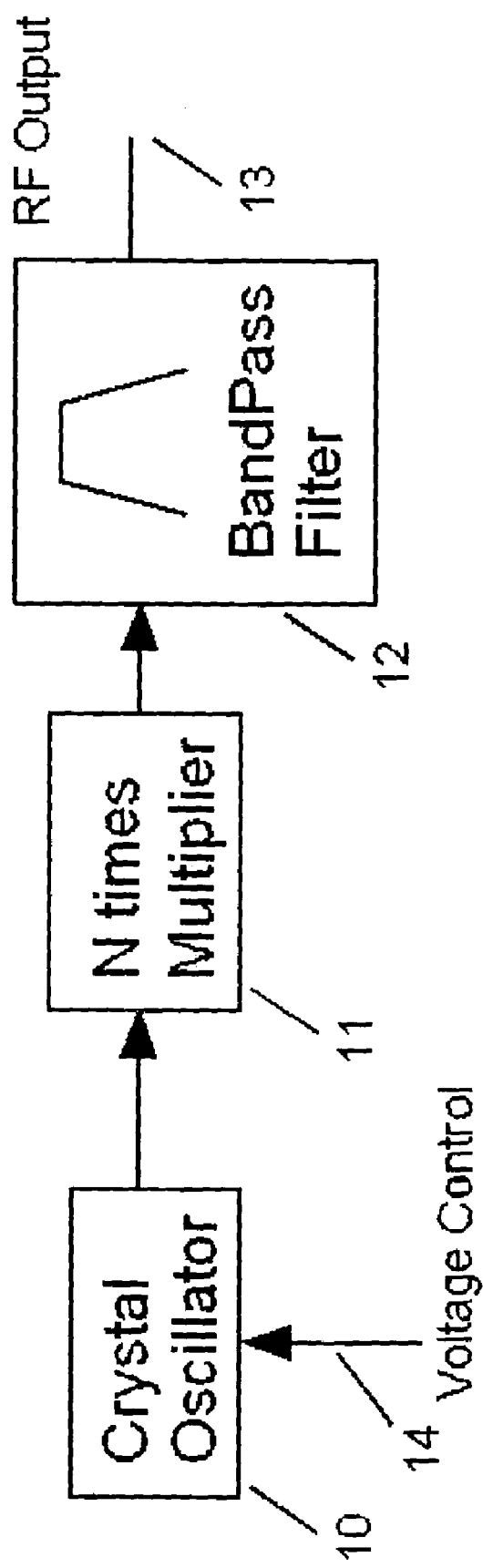
FIG. 1 is a block diagram showing a Prior Art Frequency Multiplier.

FIG. 1 illustrates first common method where a crystal oscillator output 10 is subjected to a nonlinearity which acts as a frequency multiplier 11. The desired multiplied frequency is filtered using a band pass filter 12, resulting in the RF output frequency 13. This method yields a high degree of phase noise performance but has very poor frequency agility performance. A limited amount of phase modulation is achieved by adding a voltage control 14 to the fundamental crystal oscillator.

Figure 2:
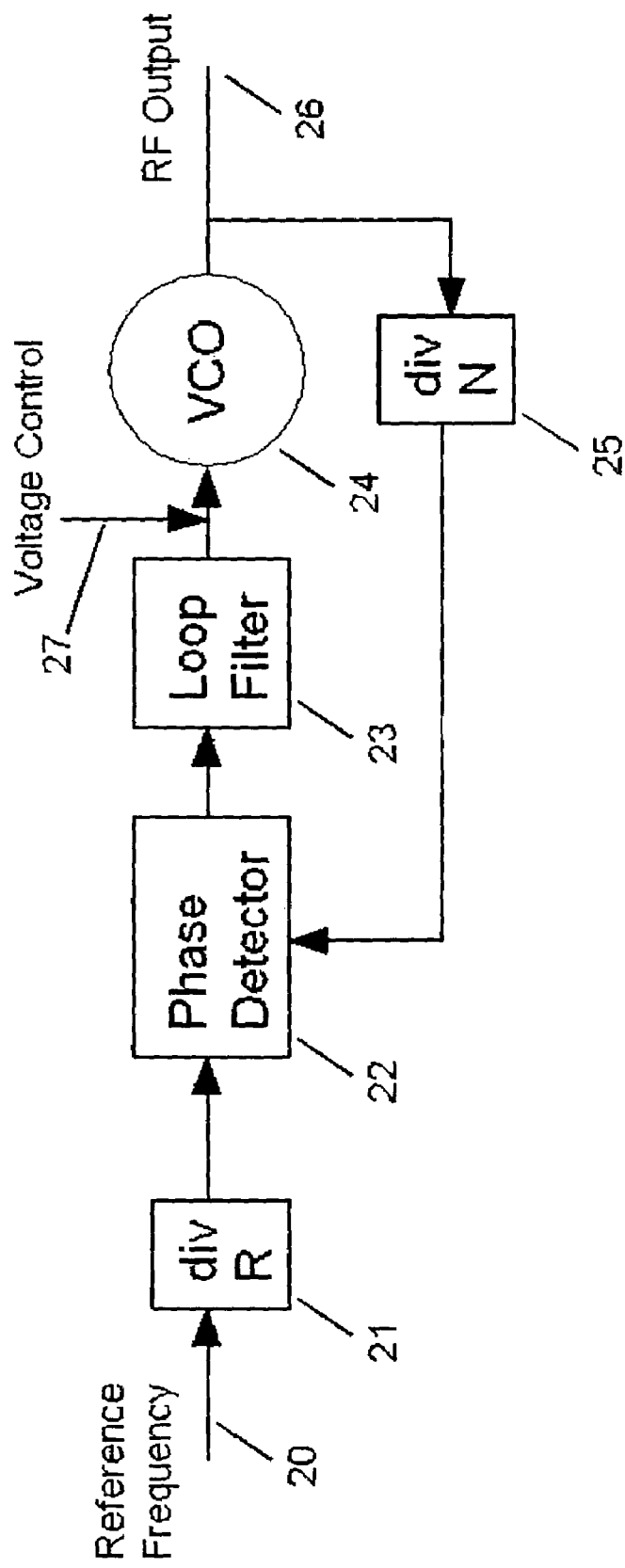
FIG. 2 is a block diagram showing a Prior Art Phase Locked Loop (PLL).

The basic principal of the second method of a PLL is shown in FIG. 2. As illustrated in the figure, a stable reference frequency 20 is divided down 21. The output RF signal frequency 26 is also divided down 25. The two divided frequency signals are then fed to the phase detector 22 for phase comparison. The phase detector 22 is used to produce an error signal that is filtered 23 with the required loop bandwidth to lock the RF oscillator 24 frequency to the reference frequency 20. The phase noise performance of the free running oscillator is worse than the reference crystal oscillator input 20. The second control of the VCO frequency is shown at 27.

Figure 3:
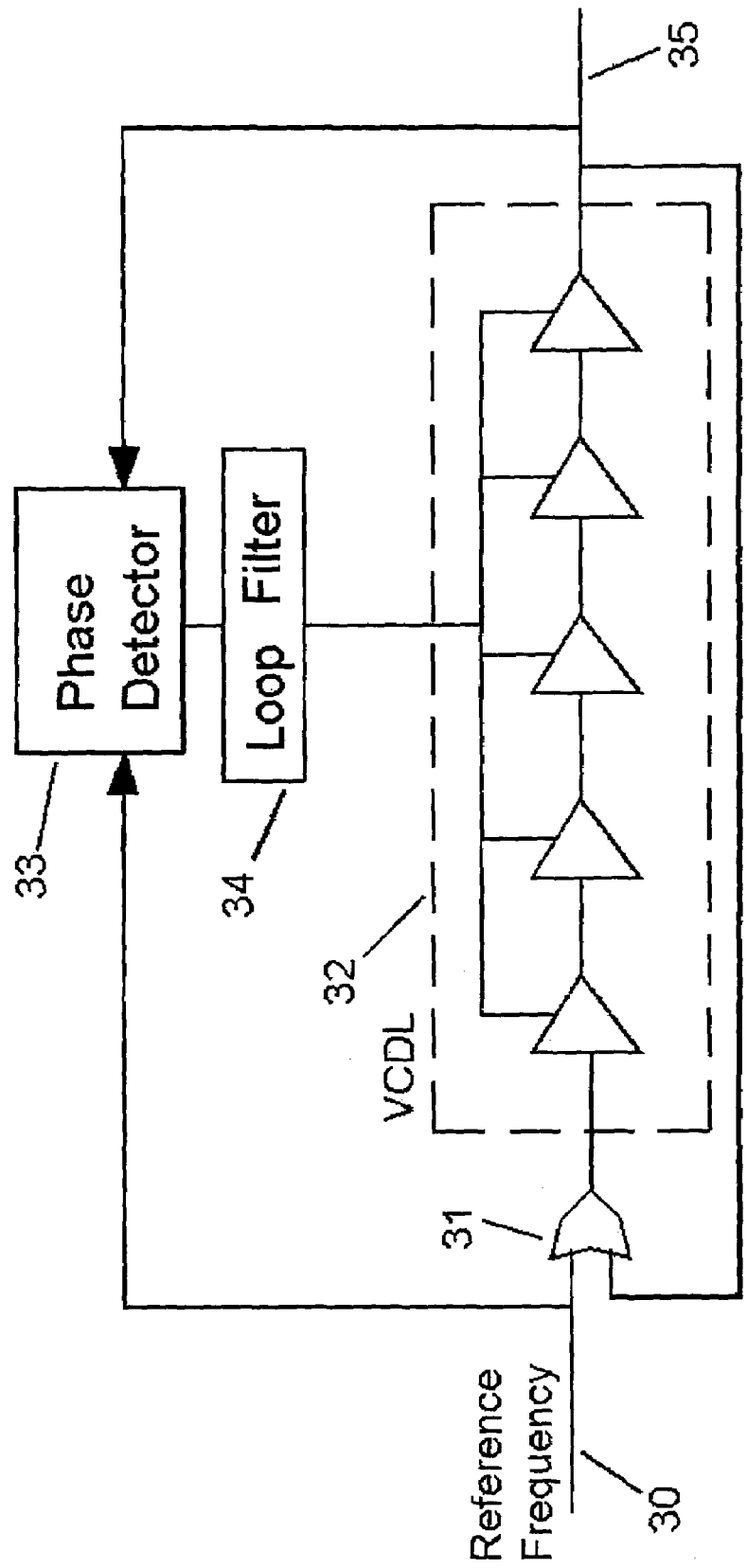
FIG. 3 is a block diagram showing a Prior Art Digital Delay Locked Loop (DLL).

FIG. 3 shows a typical implementation of the third method. The reference input 30, starts a pulse traveling down a voltage controlled delay line (VCDL) 32. The pulse is returned to the input 31 and travels down the delay line again. In this way the number of pulses required to match the desired frequency multiplication are produced. The last pulse from the output 35 is phase locked to the next input reference 30 pulse using the phase detector 33 and the loop filter 34.

Figure 4:
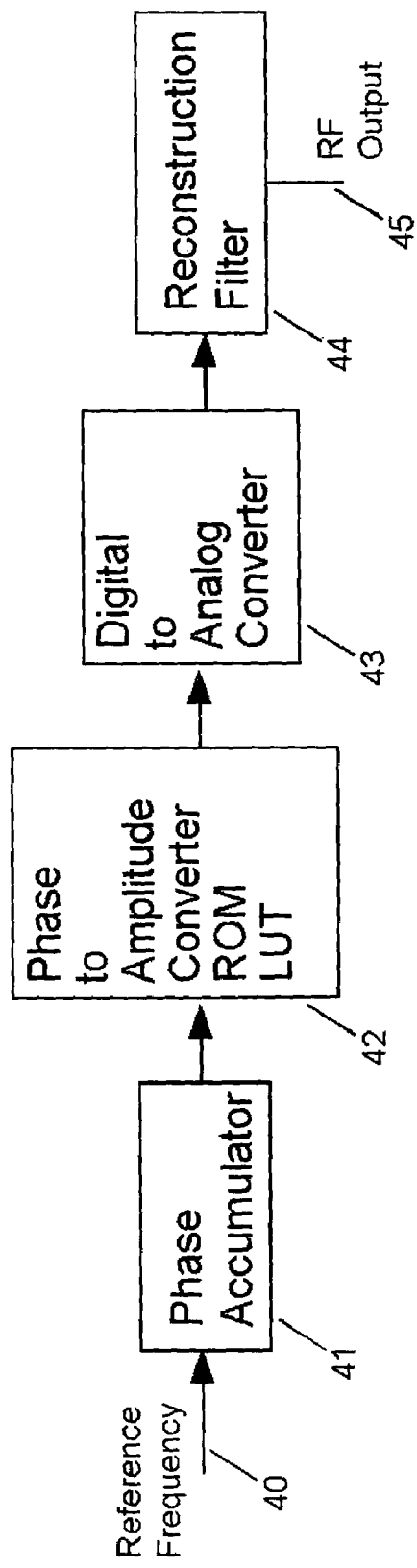
FIG. 4 is a block diagram showing a Prior Art Direct Digital Synthesis (DDS).

The fourth method is shown in FIG. 4. As shown in the figure, the clock reference input 40 is sent to a phase accumulator 41. The required phase shift is realized by using a phase to amplitude converter 42 Read only Memory (ROM) look up table. A Digital to Analog Converter (DAC) 43 is used to reconstruct the signal. External filtering 44 is used to filter off the clock and aliasing components from the DAC output thereby resulting in the desired RF signal 45. This method results in very fine frequency resolution, but produces undesired spurious signals and the output signal frequency is limited by the speed of the DAC. The signal frequency for the DDS is limited to Nyquist frequency which is half of the clock frequency to the DAC. Output signal level drops as the Nyquist frequency is approached. Phase modulation bits are commonly available in DDSs.

The Present Invention

This invention synthesizes a desired lower frequency with high resolution from a fixed frequency high speed reference clock. FIG. 5 shows a block diagram of the invention. The high speed reference clock 103 is typically an external input with high frequency absolute accuracy and very low phase noise. Examples of sources are well known in the art and include high frequency crystal oscillators, SAW oscillators, and crystal oscillators with harmonic multiplication. As shown in FIG. 5, an edge of the reference clock is delayed by an amount that is controlled by the Modulation Adder 102 along with a lookup table and programmable delay 106. The edge could be either the rising or falling edge of the reference clock. Separate circuits are used for the control of rising and falling edges of the output signal 108. This ensures that even if the duty cycle of the input reference is not 50%, the output 108 duty cycle can be controlled as both the rising edge and falling edge delay is triggered from the same edge of the reference clock 103. The desired output duty cycle is typically 50% to maximize the RF power in the fundamental frequency. However, any desired duty cycle of the output signal can be produced for special applications. The output signal 110 frequency is selected by setting the increment value. Typically, the two increment values 101*a* and 101*b* are set to be the same. The required increment value 101 is computed by using the following equation:

$$\text{Increment Value} = ((f_{ref}/f_{out}) - 1) * 2^n$$

where $f_{ref}$ = Reference clock (103) frequency
$f_{out}$ = Output (110) frequency
n = Number of bits in the accumulator math.

Table 1 shows sample calculations for an example where the high speed reference clock (103) is 1000 MHz, and the desired output RF frequency is 734.313739 MHz and n=12. Using these numbers in the frequency setting equation yields an increment value (101) of 1482. This increment value is added each high speed reference clock (103) cycle to the accumulator to produce a new accumulator value.

The second equation controls the duty cycle of the output. As shown in FIG. 5, there are separate blocks to control the rising edge delay (a) and the falling edge delay (b). To accomplish a fixed duty cycle, the increment values 101*a* and 101*b* must be the same and the initial start up values 111*a* and 111*b* in the accumulator must be set to provide for the desired fixed delay between them. The equation for the initializing value 111*b* assuming the initializing value for 111*a* to be zero is as follows:

$$\text{Initializing Value (111}b \text{ assuming 111}a \text{ is 0)} = (f_{ref}/f_{out}) * 2^n * (p/100)$$

where $f_{ref}$ = Reference clock (103) frequency
$f_{out}$ = Output (110) frequency
n = Number of bits in the accumulator math
p = Percentage duty cycle For the example shown in Table 1, for duty cycle p=50%, the initializing value 111*b* is calculated to be 2789. Table 1 illustrates that the adder/accumulator 102*a* starts at 0 and increments 1482 at every rising edge of the reference clock. At the same time adder/accumulator 102*b* starts at 2789 and increments 1482 every rising edge of the reference edge. The phase modulation required is added in the modulation adder 120. When the modulation adder 120 overflows and produces a carry out due to the math addition, an input pulse edge must be ignored or "swallowed". This corresponds to phase wraparound, i.e. the phase shift has reached 360 degrees and must be set to 0 degrees. In the present invention, $2^n$ is calibrated to equal 360 degrees of the reference clock input 103. This calibration is performed in the LUT 105 by a simple mapping of input control bits to desired control lines. The filling of the LUT 105 to perform this requirement would be well understood by those skilled in the art. The LUTs 105 can be implemented using a read only memory or with a microprocessor. When the accumulator 102 or modulation adder 120 overflows due to an addition it indicates a greater than 360 degree delay requirement. This delay is implemented by using the next clock edge rather than delaying from the original clock edge. This allows the programmable delay line 106 to act as a delay line with endless delay capability. For example if the accumulator is using 12 bit math then 360 degrees is equal to $2^{12}$ or 4096. In the example shown in Table 1, the accumulator overflows to 4446, which means the overflow bits are set to a value of 1 and accumulator value goes to 4446-4096=350. Assuming that there is no required modulation, the modulation adder will add zero phase delay to the accumulator value. The circuit implements the requirement for this value of phase delay in two parts. It activates the pulse swallow circuit to ignore one clock edge, and sets the programmable delay to 350 which completes the rest of the delay requirement. This unique feature means that any quantity of overflow bits could be handled. If the addition of the increment value 101 to the accumulator value 102 or the addition of modulation value causes, for example, two overflow bits, then the pulse swallow circuit 104 would ignore or "swallow" 2 pulses. In this way it is possible to synthesis very low frequencies 108 from the high speed clock reference 103. The delay required to achieve this is limited to one cycle at the high speed reference clock rate. Furthermore, the accuracy of the timing and jitter is excellent, as the time is always relative to the closest edge of the high speed clock reference 103. The output signal phase noise is not controlled by the loop bandwidth nor the phase noise characteristics of the voltage controlled oscillators applied in traditional methods. Instead, the phase noise performance is directly linked to the high speed reference. This reduces both the jitter and phase noise of the synthesized RF output 108. The delayed edge from the programmable delay 106a sets the output RF high 108 by enabling a set-reset flip flop 107. When the delayed edge from the programmable delay 106b reaches the flip flop, it resets the flip flop 107 and causes the RF output 108 to go low. This completes the synthesis of the RF output 108 at the preferred 50% duty cycle rate.

Figure 6:
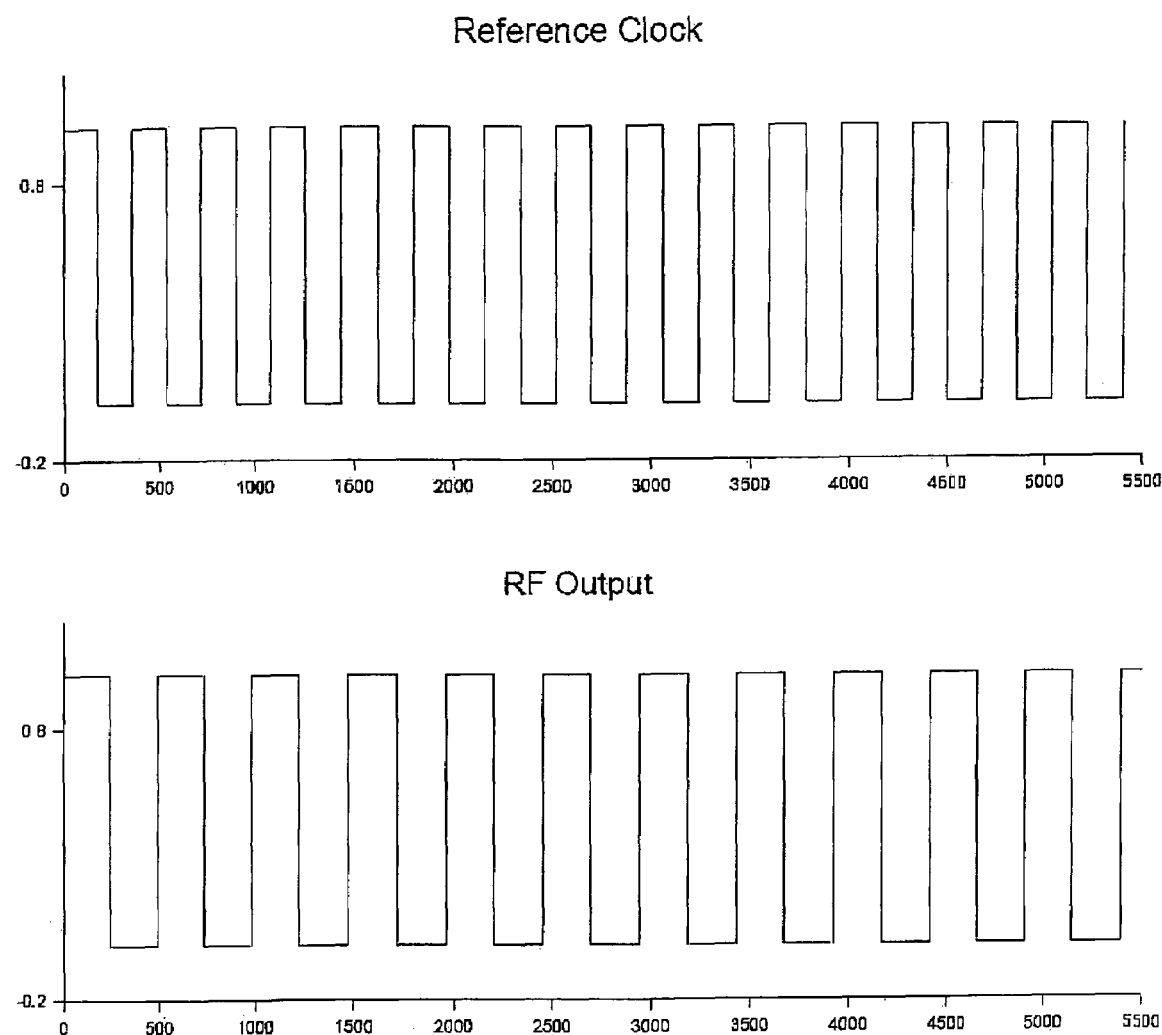
FIG. 6 is a Timing diagram for Sample shown in Table 1.

FIG. 6 illustrates time plots for the example in Table 1. The upper plot is the high speed reference clock plotted over 5500 degrees. The lower plot is the RF output 108, plotted over that same 5500 degrees of phase shift with respect to the reference clock. The lower plot demonstrated the synthesis of a lower frequency from the high speed reference clock. Optionally the output 108 can be amplified and or filtered to produce a signal that is higher in amplitude and/or having less harmonics.

The frequency step size of this invention depends on the frequency and the number of bits n in the accumulator math. It is coarser at frequencies closer to the reference clock frequency, and finer at lower frequency outputs. The worst case step size is the reference frequency divided by $2^n$, where n is equal to the number of bits in the accumulator math. In the example of Table 1, the step size is 1000 MHz divided by $2^n$. This gives a step size of approximately 244 KHz. To improve the frequency resolution an increased number of bits in the math can be used. For example with 16 bit math, the frequency resolution improves to approximately 15.2 KHz. Increasing n to 32 bits would result in approximately 0.2 Hz frequency resolution. It is only necessary to increase the number of bits of resolution in the adder/accumulators 102, and not necessarily the LUTs 105 and the programmable dividers 106. The remaining least significant bits can be truncated before the LUTs 105 with negligible effect on the RF output 108 phase noise quality. This means that very fine frequency resolution is achieved with negligible degradation in the phase noise. It can also be seen that the increment values 101 can be changed to provide an essentially instantaneous frequency change.

The phase modulation is achieved by the addition of the second modulation adder 120. This adder 120 is also high speed and runs at the full reference clock rate. The modulation adder 120 adds (positive or negative) in the high speed adder 102 in the desired phase offset to the accumulator value 102 to provide a new increment value that is sent to the look up tables 105 and the pulse swallow circuit 104. The average value provided to the modulation adder 120 is supplied from the interpolator 121 and is always zero over a long period of time. This ensures that the overall effect of the modulation adder is only a phase modulation and not a change in the center frequency of operation or duty cycle.

Figure 7:
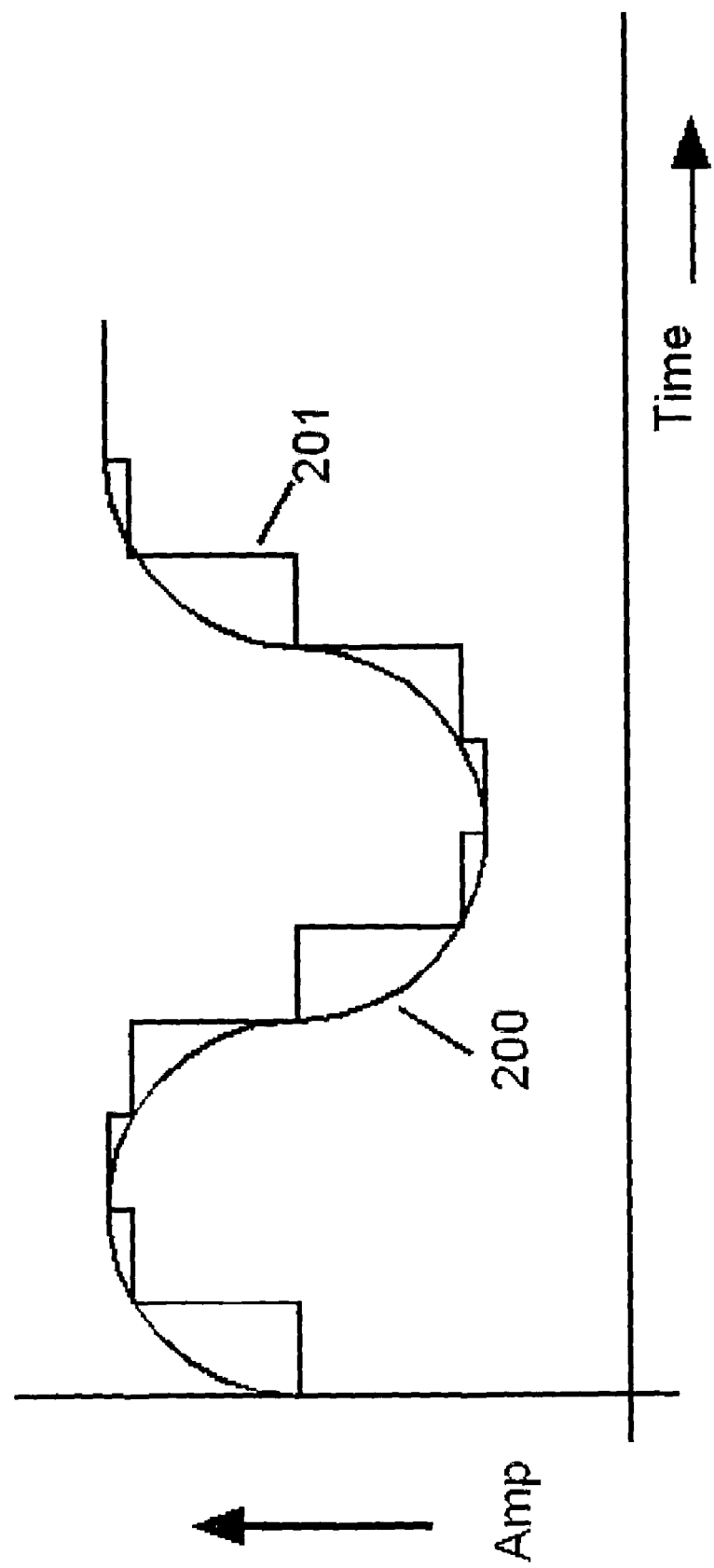
FIG. 7 is a graph showing a Sampled Baseband Spectrum.
Figure 8:
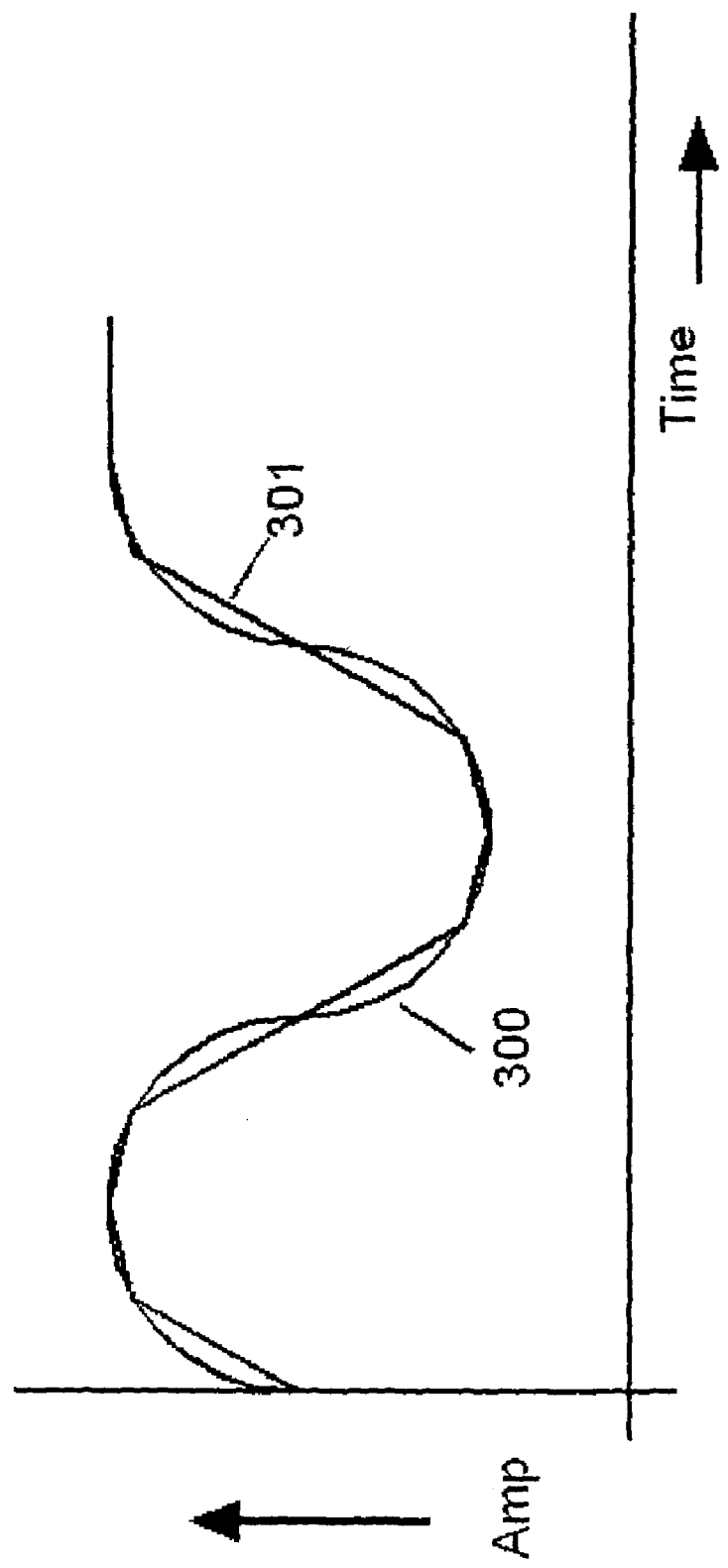
FIG. 8 is a graph showing a Linearly Interpolated Baseband Spectrum.
Figure 9:
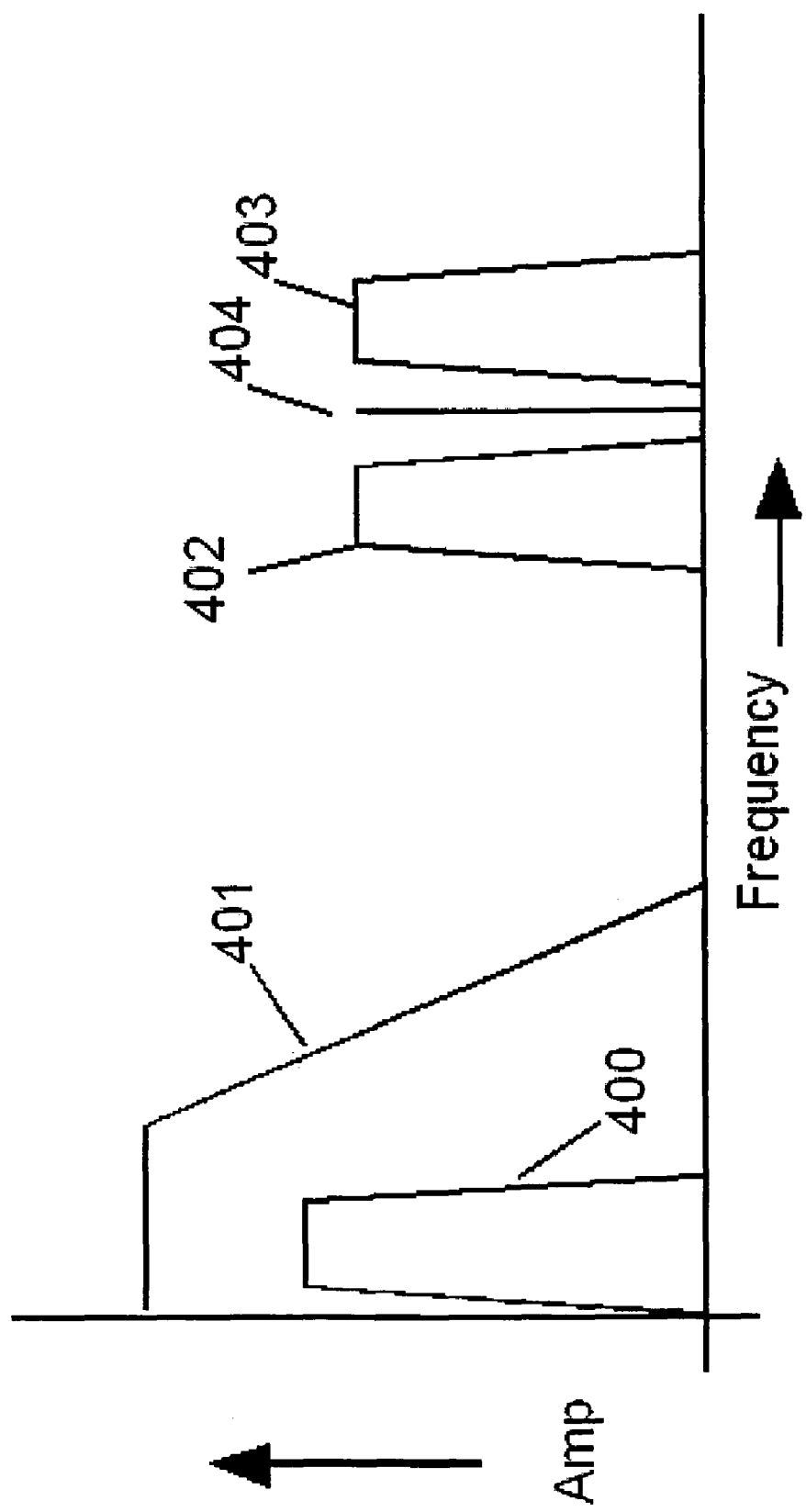
FIG. 9 is a graph showing a Sampled Baseband Frequency Spectrum.

The incoming phase modulation information 122, 123 to the interpolator 122 is at a much lower frequency baseband rate than the reference clock 103 corresponding to the digital sampling rate of the desired baseband signal. FIG. 7 illustrates an example of a sampled incoming baseband signal based on 8 samples per symbol. Graph 200 is the desired phase rate signal control. Graph 201 is the sampled input. If the graph 201 is placed through a reconstruction filter the desired shape 200 will be produced. This is illustrated in the spectrum plot shown in FIG. 9. The energy of the sampled waveform 201 is spread over the desired baseband 400 and the clock 405 and aliasing components 402 and 403. In prior art, a low pass filter 401 is used after a DAC to remove the undesired clock 405 and aliasing components 402, 403. However, in the present invention no DAC is applied as the phase modulation is added directly onto the signal digitally. Consequently, there is no place to put an analog low pass filter and the clock and the aliasing components would show up on the RF output 108. The purpose of the interpolator 121 is to reduce the clock and aliasing components and shift their frequency so they may be subsequently filtered at the RF output 108 using an optional band bass filter 109. The preferred embodiment of the interpolator is a linear interpolator, but it is also valid to use other interpolation techniques such as sin x/x interpolation and filtering. Sin x/x interpolation is well understood to those knowledgeable in the art. Linear interpolation is implemented by drawing a straight line between two known points. This is simple to implement as the increment value required for each reference clock cycle is based on the following equation: Input sample frequency 122 divided by the clock reference frequency 103 multiplied by the difference of two adjacent sampled data point values. Implementation of the interpolator 121 used to suppress clock and aliasing components is shown in FIG. 8. The linear interpolated curve 301 now has more power in the desired curve 300 than the non interpolated curve 201. The use of a full sin x/x interpolator removes the clock and aliasing components as the phase adjust then occur at every reference clock edge. This removes the need for any reconstruction filter replacing it with a fully digital solution suitable for implementation in an ASIC. An alternative arrangement (not shown) has separate interpolators for both the rising and falling pulse edges.

Another feature of the device as described is that the output frequency 108 synthesis range is very wide. The pulse swallow circuit 104 can block multiple reference clock pulses extending the programmable delay indefinitely. The limitation comes from the number of overflow bits allowed in the accumulator. The output frequency range coverage can be DC up to the high speed reference clock frequency. It is desirable to have as high a reference clock frequency as possible. A higher reference clock frequency extends the useful frequency range and improves the frequency resolution. The upper reference frequency bound of the design is mostly limited by the design speeds of the high speed adders/accumulator 102 and look up tables 105. It is understood in the art that speeds can be increased by parallel processing and other design techniques. For example, multiple high speed adders/accumulator, LUTs or programmable delay lines could be used in parallel to increase the speed and thereby the output frequency capability of the invention. The invention also accommodates plurality of design blocks such as adders, accumulators, pulses swallow circuits, lookup tables, and programmable delay lines.

It is also possible to implement the invention on every 180 degrees of the reference clock using both the rising and the falling edges. Another alternative arrangement is to position the clock swallow circuit following the programmable delay line.

It is also possible to remove the adder/accumulators 102 and replace the LUT 105 with a larger LUT 105. A simple counter could increment the values in the LUT 105. The LUT 105 would in this case hold the pre-added values, and just cycle through them until the pattern repeats.

It also possible to compromise latency for the speed of the device. It does not matter how many clock cycles it takes to implement an adder or LUT for example, as long as the resultant provides valid data out every reference clock cycle.

It is possible to use a selection of different lookup tables 105 or offset values to compensate for the temperature effect on the programmable delay lines 106. It is also possible to vary the implementation of the delay lines by altering the input clock signal. Examples of clock alteration would include frequency multiplication, division, or phase shifting.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. Apparatus for direct digital generation of a synthesized RF signal with phase modulation at a desired output frequency comprising:
   a high speed reference clock providing in an input signal having a series of signal reference edges at a frequency of the reference clock which is higher than the desired output frequency;
   programmable digital delay elements arranged to receive the reference edges of the input reference clock and to generate delayed signal edges each at a calculated delay from a respective reference edge;
   wherein the programmable digital delay elements include an input element for receiving an increment value defining the required phase modulation and providing a delay value for said calculated delay from said increment value;
   wherein the programmable digital delay elements comprises a high speed adders/accumulator which is arranged to determine the amount of delay implemented by the delay elements on the reference edge;
   and wherein the output frequency is set from the increment value according to the following equation:

Increment Value=$((f_{ref}/f_{out})-1)*2^n$ where $f_{ref}$=Reference clock frequency
   $f_{out}$=Output frequency
   $n$=Number of bits in the accumulator math;

TABLE 1

| | Rising Edge | | | | | Falling Edge | | | |
|---|---|---|---|---|---|---|---|---|---|
| Accumulator | Overflow bits | Base Accumulator | Equilvalent Delay from Nearest Ref Edge (deg) | Total Effective Delay (deg) | Accumulator | Overflow bits | Base Accumulator | Equilvalent Delay from Nearest Ref Edge (deg) | Total Effective Delay (deg) |
| 0 | 0 | 0 | 0 | 0 | 2789 | 0 | 2789 | 245.13 | 245.13 |
| 1482 | 0 | 1482 | 130.25 | 490.25 | 4271 | 1 | 175 | 15.38 | 735.38 |
| 2964 | 0 | 2964 | 260.51 | 980.51 | 1657 | 0 | 1657 | 145.63 | 1225.63 |
| 4446 | 1 | 350 | 30.76 | 1470.76 | 3139 | 0 | 3139 | 275.89 | 1715.89 |
| 1832 | 0 | 1832 | 161.02 | 1961.02 | 4621 | 1 | 525 | 46.14 | 2206.14 |
| 3314 | 0 | 3314 | 291.27 | 2451.27 | 2007 | 0 | 2007 | 176.4 | 2696.4 |
| 4796 | 1 | 700 | 61.52 | 2941.52 | 3489 | 0 | 3489 | 306.65 | 3186.65 |
| 2182 | 0 | 2182 | 191.78 | 3431.78 | 4971 | 1 | 875 | 76.9 | 3676.9 |
| 3664 | 0 | 3664 | 322.03 | 3922.03 | 2357 | 0 | 2357 | 207.16 | 4167.16 |
| 5146 | 1 | 1050 | 92.29 | 4412.29 | 3839 | 0 | 3839 | 337.41 | 4657.41 |
| 2532 | 0 | 2532 | 222.54 | 4902.54 | 5321 | 1 | 1225 | 107.67 | 5147.67 |
| 4014 | 0 | 4014 | 352.79 | 5392.79 | 2707 | 0 | 2707 | 237.92 | 5637.92 |
| 5496 | 1 | 1400 | 123.05 | 5883.05 | 4189 | 1 | 93 | 8.17 | 6128.17 |
| 2882 | 0 | 2882 | 253.3 | 6373.3 | 1575 | 0 | 1575 | 138.43 | 6618.43 |
| 4364 | 1 | 268 | 23.55 | 6863.55 | 3057 | 0 | 3057 | 268.68 | 7108.68 |
| 1750 | 0 | 1750 | 153.81 | 7353.81 | 4539 | 1 | 443 | 38.94 | 7598.94 |
| 3232 | 0 | 3232 | 284.06 | 7844.06 | 1925 | 0 | 1925 | 169.19 | 8089.19 |
| 4714 | 1 | 618 | 54.32 | 8334.32 | 3407 | 0 | 3407 | 299.44 | 8579.44 |
| 2100 | 0 | 2100 | 184.57 | 8824.57 | 4889 | 1 | 793 | 69.7 | 9069.7 |
| 3582 | 0 | 3582 | 314.82 | 9314.82 | 2275 | 0 | 2275 | 199.95 | 9559.95 |
| 5064 | 1 | 968 | 85.08 | 9805.08 | 3757 | 0 | 3757 | 330.21 | 10050.21 |
| 2450 | 0 | 2450 | 215.33 | 10295.33 | 5239 | 1 | 1143 | 100.46 | 10540.46 |
| 3932 | 0 | 3932 | 345.59 | 10785.59 | 2625 | 0 | 2625 | 230.71 | 11030.71 |
| 5414 | 1 | 1318 | 115.84 | 11275.84 | 4107 | 1 | 11 | 0.97 | 11520.97 |
| 2800 | 0 | 2800 | 246.09 | 11766.09 | 1493 | 0 | 1493 | 131.22 | 12011.22 |
| 4282 | 1 | 186 | 16.35 | 12256.35 | 2975 | 0 | 2975 | 261.47 | 12501.47 |
| 1668 | 0 | 1668 | 146.6 | 12746.6 | 4457 | 1 | 361 | 31.73 | 12991.73 |

Reference Clock Frequency 1000 Mhz
Example synthesis of 734.3133739 Mhz, with 12 bit math/delay
Increment value = $(2^{12} * 1000\ MHz/734.3133739\ MHz) - 2^{12}$
Increment Value = 1482
Falling Edge Accumulator Start Value = (50% of (1000 MHz/734.3133739 MHz) * $2^{12}$) = 2789 and a signal combining element for receiving the delayed signal edges and for generating the RF signal therefrom.

2. The apparatus according to claim 1 wherein the programmable digital delay elements comprise a look-up table for providing increments to be added to calculate said delay.

3. The apparatus according to claim 2 wherein the lookup table has a multiple set of lookup tables to be used for temperature compensation of the programmable delay line.

4. The apparatus according to claim 1 wherein the reference clock provides an external input with high frequency absolute accuracy and very low phase noise performance.

5. The apparatus according to claim 1 wherein the programmable digital delay elements are arranged such that said reference edge may be either the rising or falling edge of the reference clock.

6. The apparatus according to claim 1 wherein said programmable digital delay elements have separate controls for producing the rising and falling edges of the output from the same input edge of the reference clock.

7. The apparatus according to claim 1 wherein the programmable digital delay elements are arranged to be varied by altering the input signal of the reference clock.

8. The apparatus according to claim 1 wherein in association with the high speed adder/accumulator there is provided a pulse swallow circuit which is controlled by the carry bits (overflow bits) of the high speed adder/accumulator in order to extend the delay to multi cycles of the input reference clock.

9. The apparatus according to claim 8 wherein the pulse swallow circuit is arranged to discard multiple pulses of the reference clock.

10. The apparatus according to claim 8 wherein said pulse swallow circuit is located prior to or following the high speed adder/accumulator.

11. The apparatus according to claim 1 wherein the high speed adder/accumulator are arranged such that 360 degrees of phase delay of the programmable delay is calibrated to $2^n$ of the phase accumulator value using a look up table or microprocessor.

12. The apparatus according to claim 1 wherein the input element comprises a modulation adder for providing a value to be added to the delay from said accumulator/adders.

13. The apparatus according to claim 12 wherein said modulation adder is arranged to add in positive or negative phase offset to the accumulator value to produce the required phase modulation.

14. The apparatus according to claim 12 wherein there is provided an interpolator which is arranged to interpolate sampled base band modulated information to provide data for said modulation adder.

15. The apparatus according to claim 14 wherein the interpolator is a linear interpolator or a sin x/x interpolator filter.

16. The apparatus according to claim 14 wherein the interpolator is arranged such that the need for a reconstruction filter is removed by interpolation up to the input signal rate of the reference clock.

17. The apparatus according to claim 14 wherein there is provided a plurality of separate interpolators for both rising and falling pulse edges of the reference clock.

18. The apparatus according to claim 1 wherein the signal combining element comprises a flipflop.

19. The apparatus according to claim 18 wherein said flipflop is arranged to combine the delayed signal edges from separate rising and falling pulse edges of the reference clock to form any desired duty cycle output.

20. The apparatus according to claim 19 wherein said output duty cycle is not dependent on an input duty cycle of the input signal of the reference clock.

21. The apparatus according to claim 1 wherein an output duty cycle is varied relative to an input duty cycle by changing difference in initialization values of two separate adders/accumulators forming the programmable digital delay elements for the separate rising and falling pulse edges of the reference clock.

22. The apparatus according to claim 21 wherein the output duty cycle is set by initializing a difference of the initializing values of the two separate adders/accumulators according to the following equation:

The difference equals the reference clock frequency divided by the desired output frequency multiplied by $2^n$ multiplied by (p/100), where p is the percentage duty cycle and n is the number of bits in the accumulator math.

23. The apparatus according to claim 1 wherein the number of bits of math used in the adder/acumulator is equal to or exceeds the number of bits of control in lookup table and for the programmable delay.

24. The apparatus according to claim 1 wherein the speed is increased by using parallel processing in the high speed adder/accumulator.

25. The apparatus according to claim 1 wherein the adder/accumulator is implemented in a larger lookup table wherein all the table precomputed and stored.

26. The apparatus according to claim 1 wherein the components are formed fully digitally in an ASIC with no requirement for a voltage controlled oscillator, loop filter, or Digital to Analog converter.

27. The apparatus according to claim 1 wherein there is further provided amplification and filtering of the output to produce a signal that is higher in amplitude and/or having less harmonics.

* * * * *